(12) United States Patent
Scharmüller et al.

(10) Patent No.: US 9,114,830 B2
(45) Date of Patent: Aug. 25, 2015

(54) STEERING AXLE

(76) Inventors: Josef Scharmüller, Fornach (AT); Josef Scharmüller, Jr., Fornach (AT)

( * ) Notice: Subject to any disclaimer, the term of this patent is extended or adjusted under 35 U.S.C. 154(b) by 0 days.

(21) Appl. No.: 14/345,145

(22) PCT Filed: Sep. 13, 2012

(86) PCT No.: PCT/AT2012/000236
§ 371 (c)(1),
(2), (4) Date: Jul. 8, 2014

(87) PCT Pub. No.: WO2013/036978
PCT Pub. Date: Mar. 21, 2013

(65) Prior Publication Data
US 2014/0318884 A1    Oct. 30, 2014

(30) Foreign Application Priority Data
Sep. 16, 2011  (AT) .............................. A 1341/2011

(51) Int. Cl.
*B62D 5/20* (2006.01)
*B62D 5/26* (2006.01)
*B62D 7/18* (2006.01)
*B62D 13/02* (2006.01)
*B62D 13/04* (2006.01)

(52) U.S. Cl.
CPC .. *B62D 5/20* (2013.01); *B62D 5/26* (2013.01); *B62D 7/18* (2013.01); *B62D 13/025* (2013.01); *B62D 13/04* (2013.01)

(58) Field of Classification Search
CPC ............ B62D 7/18; B62D 5/26; B62D 13/04; B62D 13/025
USPC ....................................... 280/93.512
See application file for complete search history.

(56) References Cited

U.S. PATENT DOCUMENTS

| 4,359,123 | A | | 11/1982 | Haupt et al. | |
| 5,090,719 | A | * | 2/1992 | Hanaoka | 280/408 |
| 6,131,691 | A | * | 10/2000 | Morch | 180/418 |
| 6,158,759 | A | * | 12/2000 | Perry | 280/444 |
| 7,086,660 | B2 | * | 8/2006 | Bruening et al. | 280/442 |
| 7,275,754 | B2 | | 10/2007 | Scharmueller | |
| 7,311,446 | B2 | * | 12/2007 | Koschinat | 384/221 |
| 7,547,035 | B2 | | 6/2009 | Scharmueller | |

(Continued)

FOREIGN PATENT DOCUMENTS

| AT | 508251 | A4 | 12/2010 | | |
| CA | 2259862 | A1 | * 7/2000 | ............... | B60G 5/01 |

(Continued)

OTHER PUBLICATIONS

International Search Report issued by the European Patent Office in International Application PCT/AT2012/000236 on Jan. 24, 2013.

*Primary Examiner* — Nicole Verley
(74) *Attorney, Agent, or Firm* — Henry M. Feiereisen LLC.

(57) ABSTRACT

The invention relates to a steering axle (1) for a vehicle, wherein steering levers (31, 32) are articulated to both sides of an axle body (2) and each of the steering levers (31, 32) is operatively connected to a track arm (41, 42), and a tie rod (5) is hingedly connected at both ends at attack points (61, 62) to the track arms (41, 42). It is proposed to provide the track arms (41, 42) with an adjustment device (71, 72) for changing the position of the attack points (61, 62).

10 Claims, 2 Drawing Sheets

(56) References Cited

U.S. PATENT DOCUMENTS

| | | |
|---|---|---|
| 7,559,569 B2 * | 7/2009 | Nejsum .................. 280/459 |
| 7,618,052 B2 | 11/2009 | Scharmueller |
| 8,596,665 B2 | 12/2013 | Scharmueller |
| 8,600,620 B2 * | 12/2013 | Noel .................. 701/41 |
| 2005/0012301 A1 | 1/2005 | Scharmueller |
| 2006/0175800 A1 | 8/2006 | Scharmueller |
| 2007/0138764 A1 | 6/2007 | Scharmueller |
| 2011/0196575 A1 | 8/2011 | Scharmueller |
| 2012/0059549 A1 * | 3/2012 | Noel .................. 701/41 |
| 2012/0274049 A1 | 11/2012 | Scharmueller |

FOREIGN PATENT DOCUMENTS

| | | |
|---|---|---|
| DE | 102004053725 A1 | 5/2006 |
| WO | WO2011/072316 A1 | 6/2011 |

* cited by examiner

STEERING AXLE

CROSS-REFERENCES TO RELATED APPLICATIONS

This application is the U.S. National Stage of International Application No. PCT/AT2012/000236, filed Sep. 13, 2012, which designated the United States and has been published as international Publication No. WO 2013/036978 and which claims the priority of Austrian Patent. Application, Serial No. A 1341/2011, filed Sep. 16, 2011, pursuant to 35 U.S.C. 119(a)-(d).

BACKGROUND OF THE INVENTION

The invention relates to a steering axle.

Such steering axles are particularly used for trailers with steered axles to thereby attempt to maintain the trailer better in the track of a tractor. This is often realized only inadequately in practice however.

SUMMARY OF THE INVENTION

Object of the invention is the provision of a steering axle of the afore-stated type which is able to obviate the mentioned disadvantages and to ensure a good tracking of a trailer in a simple manner.

This is achieved according to the invention by a steering axle for a vehicle, including steering levers articulated on both sides of an axle body, each of the steering levers operatively connected to a track arm, and a tie rod pivotally connected on both ends at attack points to the track arms, wherein the track arms have an adjustment device to change the position of the attack points.

This achieves the advantage that the dependence of the steer angle of the wheels of the axle to each other can be suited in a simple manner to the given geometry of a vehicle combination. This ensures that all wheels meet the kinematic condition that their axes of rotation intersect in the pivot point of the vehicle combination. As a result, wear of the wheels and stress on the surface, in particular with respect to shear forces, can be kept small. Furthermore, the force required for the movement of the vehicle combination can be kept low.

The subclaims relate to further advantageous configurations of the invention.

Furthermore, the invention relates to a trailer having at least one steering axle according to one of the patent claims 1 to 5, so that a trailer can be provided with the benefits of the steering axle.

Reference is expressly made to the wording of the claims, so that the claims are incorporated at this point by reference to the description and interpreted as reproduced literally.

BRIEF DESCRIPTION OF THE DRAWING

The invention will be described in greater detail with reference to the accompanying drawings, in which preferred embodiments are shown by way of example. It is shown in.

DETAILED DESCRIPTION OF PREFERRED EMBODIMENTS

Figure 1:
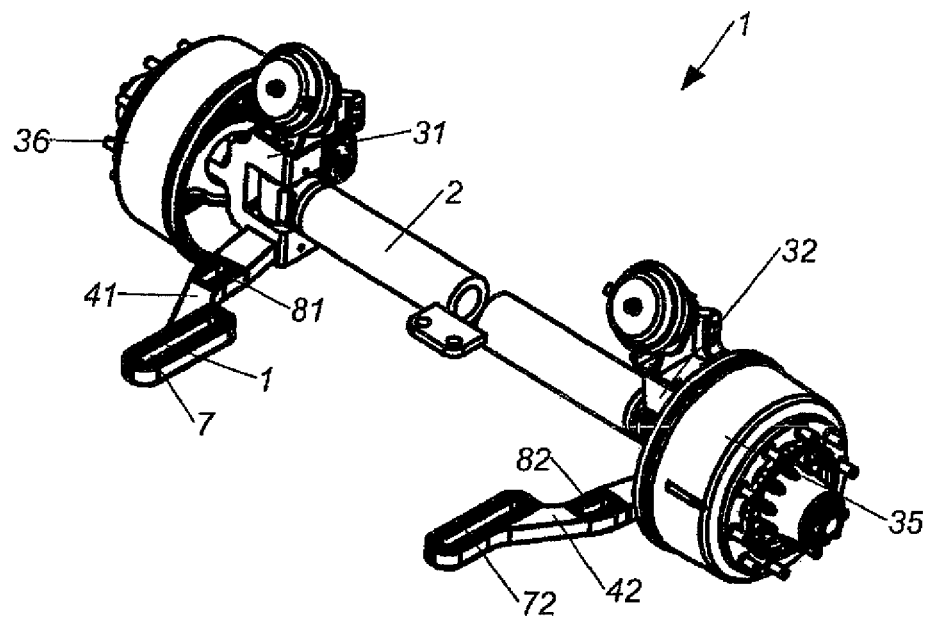
FIG. 1 a perspective view of a steering axle.
Figure 2:
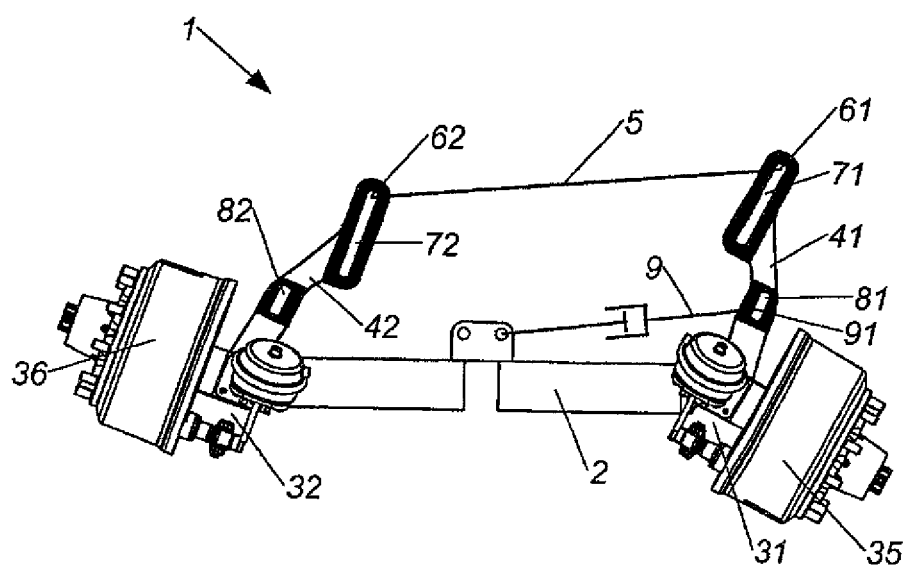
FIG. 2 a plan view of the steering axle according to FIG. 1, wherein a slave cylinder is further shown schematically.
Figure 3:
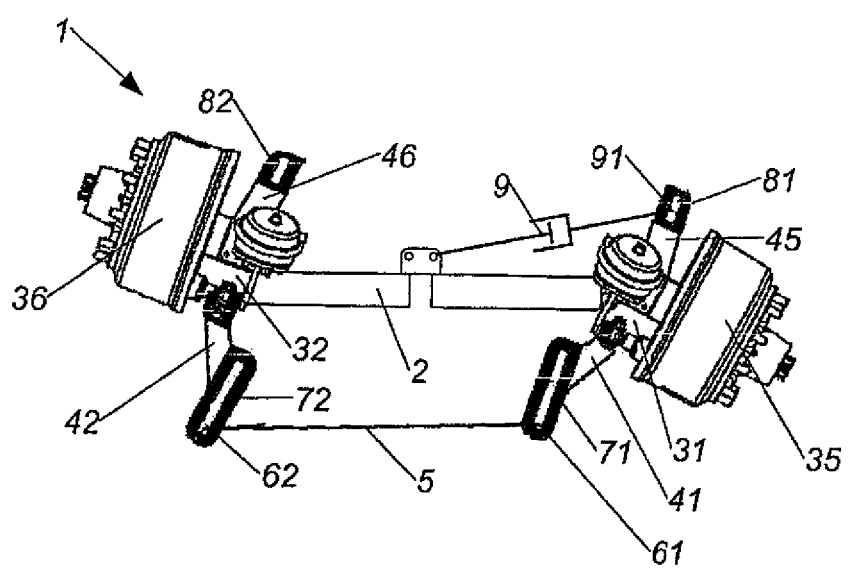
FIG. 3 a plan view of a further embodiment of the steering axle.

FIGS. 1 to 3 show preferred embodiments of a steering axle 1 for a vehicle, with steering levers 31, 32 being articulated on both sides of an axle body 2, and with each of the steering levers 31, 32 interacting with a track arm 41, 42, and with a tie rod 5 being pivotally connected on both ends at attack points 61, 62 to the track arms 41, 42.

Such steering axles 1 are typically used in land vehicles, wherein the vehicle may involve a driven tractor or a steered trailer. Connected to the steering levers 31, 32 are rims 35, 36 on which the wheels are mounted.

The track arms 41, 42 have an adjustment device 71, 72 for changing the position of the attack points 61, 62.

The steering axle 1 can be used in particular when power-steered trailers are involved.

The presence of the track arms 41, 42 and the tie rod 5 ensures that pivoting of one of the wheels causes a pivoting of the other one of the wheels of the steering axle 1. This ensures that not merely one of the wheels is pivoted.

By changing the attack points 61, 62, the dependence of the pivot angle of the wheels can be changed in relation to one another. It is preferably provided that when traveling in a circle to pivot the inner one of the wheels more than the outer one of the wheels. It is known through appropriate geometry that the pivot angles of the wheels are the same and equal to zero when traveling straight ahead, but different when the wheels are turned.

When the rotation axes of the wheels point to the pivot point of the vehicle, the wheels can be moved without lateral displacement, when the vehicle continues to travel. In the event the wheels do not point to the pivot point of the vehicle, the wheels apply a shearing force in the direction of its rotation axis upon the surface, when the vehicle continues to travel, with the possibility that the wheels shift with a component in the direction of their rotation axis. Such a stress cause damage to the surface and increases the force required for the movement of the vehicle. Furthermore, wear of the wheels is increased.

When a combination of a tractor and a trailer is involved, with the trailer having a rigid axle and at least one steered axle, and with the tractor also having a rigid axle and a steered axle, as is often customary in agriculture for example, the pivot point of the vehicle combination is determined essentially by the two rigid axles. The pivot point of the vehicle combination and thus the pivot point of the trailer is modified, when using another tractor.

With the adjustment device 71, 72, the attack points 61, 62, the tie rod 5, and thus the pivot angles of the wheels can be changed relative to one another and suited to the situation of the vehicle combination at hand. In this way, the movement of the vehicle combination can be changed in a simple manner so that in particular the force required for pulling the trailer can be significantly reduced. Furthermore, wear can be kept low.

A simple configuration of the adjustment device 71, 72 involves the implementation as an oblong hole. This further provides the advantage of a very precise adjustment.

According to another configuration, provision may be made for the tie rod 5 to be arranged in only a few positions in the adjustment range.

The adjustment device 71, 72 may be implemented by devices that are known to the artisan for this functionality.

The steering axle 1 may be configured as a center cone axle, as shown in FIGS. 1 and 2.

Other configurations may also be provided which involve a configuration of the steering axle as trailing steering axle. This design allows the trailer to be easily coupled to a tractor, which does not provide the conditions for power steering, and the trailing steering axle to be released. The known properties of a trailing steering axle can hereby be utilized.

The track arms 41, 42 may be arranged in front or behind the axle body 2—as seen in installation position with respect to a forward travel.

Preferably, at least one further adjustment device 81, 82 may be provided for changing the position of a further attack point 91 for a slave cylinder 9 of a power steering system.

In the configuration according to FIGS. 1 and 2, the track arms 41, 42 include the at least one further adjustment device 81, 82. The further adjustment devices 81, 82 are arranged hereby on the track arms 41, 42, respectively. It can also be provided that only one of the at least one further adjustment device 81, 82 is arranged on the track arms 41, 42. The construction can hereby be kept simple and the number of levers operably connected to the steering levers 31, 32 can be kept small.

In the embodiment according to FIG. 3, the at least one further adjustment device 81, 82 is arranged on an adjustment lever 45, 46 which is operatively connected to one of the steering levers 31, 32. The track arms 41, 42 and the adjustment levers 45, 46 can be easily suited to the respective forces to be expected and overall a very reliable steering axle 1 can be provided.

Provision may be made for the adjustment lever 45, 46 to be formed on only one of the steering levers 31, 32. In other configurations, as shown in FIG. 3, the steering levers 31, 32 can be formed with the adjustment levers 45, 46, respectively.

Using the adjustment device 71, 72 for the tie rod 5, the pivot angle of the wheels can be varied in relation to one another and set, with the further adjustment device 81, 82 allowing a modification of the pivot angle of the wheels in dependence on the signal of the power steering device.

Provision can hereby be made for the signal from the power steering device to be taken from the angle between the tractor and the trailer. The further adjustment device 81, 82 then allows a change of the pivot angle in dependence on the angle between the tractor and the trailer.

Changing the pivot angle in dependence on the angle between the tractor and the trailer may also be modified for example by using different slave cylinders, wherein the provision of the further adjustment device 81, 82 provides a particularly simple adjustment option.

A trailer with the steering axle 1 is able to provide the afore-described advantages, realizing a high reliability and durability of the entire vehicle combination. In particular, the required power of the tractor can be kept low.

What is claimed is:

1. A steering axle for a vehicle, comprising:
steering levers articulated on both sides of an axle body;
track arms operatively connected to the steering levers in one-to-one correspondence;
a tie rod pivotally connected on both ends at attack points to the track arms, said track arms having a first adjustment device to change a position of the attack points; and
at least one second adjustment device configured to change a position of a further attack point for a slave cylinder of a power steering system,
wherein one of the track arms includes the at least one second adjustment device.

2. The steering axle of claim 1, wherein the first adjustment device is formed as an oblong hole.

3. The steering axle of claim 1, constructed in the form of a center cone axle.

4. The steering axle of claim 1, constructed in the form of a trailing steering axle.

5. The steering axle of claim 1, further comprising an adjusting lever operatively connected to one of the steering levers, said at least one second adjustment device being arranged on the adjusting lever.

6. A trailer, comprising at least one steering axle, said at least one steering axle including steering levers articulated on both sides of an axle body, track arms operatively connected to the steering levers in one-to-one correspondence, and a tie rod pivotally connected on both ends at attack points to the track arms, said track arms having a first adjustment device to change a position of the attack points, and at least one second adjustment device configured to change a position of a further attack point for a slave cylinder of a power steering system, wherein one of the track arms includes the at least one second adjustment device.

7. The trailer of claim 6, wherein the first adjustment device is formed as an oblong hole.

8. The trailer of claim 6, wherein the steering axle is constructed in the form of a center cone axle.

9. The trailer of claim 6, wherein the steering axle is constructed in the form of a trailing steering axle.

10. The trailer of claim 6, further comprising an adjusting lever operatively connected to one of the steering levers, said at least one second adjustment device being arranged on the adjusting lever.

* * * * *